(12) United States Patent
Huang

(10) Patent No.: US 9,120,532 B2
(45) Date of Patent: *Sep. 1, 2015

(54) DRIVING DEVICE, ELECTROMECHNICAL ACTUATOR, AND CLUTCH DRIVER THEREOF

(76) Inventor: Yung-Sung Huang, Taipei (TW)

( * ) Notice: Subject to any disclaimer, the term of this patent is extended or adjusted under 35 U.S.C. 154(b) by 503 days.

This patent is subject to a terminal disclaimer.

(21) Appl. No.: 13/479,344

(22) Filed: May 24, 2012

(65) Prior Publication Data

US 2013/0263697 A1 Oct. 10, 2013

(30) Foreign Application Priority Data

Apr. 9, 2012 (TW) ............................. 101206406 U

(51) Int. Cl.
*B62M 6/55* (2010.01)
(52) U.S. Cl.
CPC ........................................ *B62M 6/55* (2013.01)
(58) Field of Classification Search
USPC ............ 180/206.4; 192/41 R; 74/325, 665 A, 74/665 B, 665 C
See application file for complete search history.

(56) References Cited

U.S. PATENT DOCUMENTS

| 5,901,807 | A | * | 5/1999 | Tseng | ........................ 180/206.3 |
| 5,984,335 | A | * | 11/1999 | Tseng | ........................... 280/253 |
| 6,554,730 | B1 | * | 4/2003 | Sakai et al. | ................... 475/195 |
| 7,284,631 | B2 | * | 10/2007 | Rizzetto | ..................... 180/206.4 |
| 2014/0150569 | A1 | * | 6/2014 | Huang | ..................... 73/862.333 |
| 2014/0196970 | A1 | * | 7/2014 | Biechele | .................... 180/206.4 |

* cited by examiner

*Primary Examiner* — Tony Winner
(74) *Attorney, Agent, or Firm* — Bacon & Thomas, PLLC

(57) ABSTRACT

A driving apparatus, an electromechnical actuator and a clutch driver are disclosed. A variable-speed gear disk module and an electric driving component are linked, and a one-way bearing is installed between the variable-speed gear disk and a pedal driving module, such that a user can selectively use the electric driving component to drive a gear disk in order to drive a bicycle body to move forward, without driving a pedal module by a feed-back link. When the pedal module is used to drive the bicycle body to move forward, the electric driving component will not be driven by the feed-back link, so as to prevent accidents caused by the pedal module that is rotated with the gear disk at a high speed.

20 Claims, 4 Drawing Sheets

US 9,120,532 B2

DRIVING DEVICE, ELECTROMECHNICAL ACTUATOR, AND CLUTCH DRIVER THEREOF

CROSS-REFERENCE TO RELATED APPLICATION

This application claims the benefit of Taiwan Patent Application No. 101206406, filed on Apr. 9, 2012, in the Taiwan Intellectual Property Office, the disclosure of which is incorporated herein in its entirety by reference.

BACKGROUND OF THE INVENTION

1. Field of the Invention

The present invention relates to a driving apparatus, an electromechnical actuator and a clutch driver thereof, and more particularly to the driving apparatus with a one-way clutch between an electric driving component and a pedal shaft driving component.

2. Description of the Related Art

Bicycle is one of the popular and extensively used leisure sports and transportation means, and its main idea is to make use of a rider's pedaling force exerted on a gear disk to drive and rotate a rear wheel, and further use the pedal force as a forward-driving power source. However, when a rider rides a bicycle on a slope or in a long distance, the ride may be affected by the rider's insufficient pedaling force or fatigue. Such ride requiring a powerful pedaling force may become a burden, particularly for the elderly, female riders or children. Based on the aforementioned reasons, an electric driving component is introduced and selectively used to substitute the pedal shaft driving component to drive an electric bicycle (or an electric auxiliary bicycle).

Although the electric bicycle is convenient, the structural design is complicated and the cost is high, so that the selling price is usually not affordable by general consumers. In addition, the electric driving apparatus installed in the conventional electric bicycle is heavy in weight and large in size, so that the entire bicycle body is over-weighted and bulky to most users. Although the electric driving component of the conventional electric bicycle can achieve the effect of driving the gear disk to rotate and driving the bicycle body to move forward, yet accidents may occur since the gear disk and the pedal shaft component are latched with each other and rotated together. When the gear disk rotates, the pedal shaft and the pedal are also rotated accordingly (and sometimes, they are rotated at a high speed). As a result, the rider may not be able to set both feet on the pedals easily or the rider may fail to control the center of gravity stably during the ride. Therefore, the inventor of the present invention designed and developed a driving apparatus, an electromechnical actuator and a clutch driver to overcome the drawbacks of the prior art and to improve the practical application of these components.

SUMMARY OF THE INVENTION

In view of the aforementioned deficiencies of the prior art, it is a primary objective of the present invention to provide the driving apparatus, electromechnical actuator and clutch driver to overcome the deficiencies of the prior art.

To achieve the aforementioned objective, the present invention provides a driving apparatus comprising: a supporting shaft tube, being a long straight hollow tube; a vertical shaft motor, installed in the supporting shaft tube; a gear speed governor, including at least one reduction gear set installed on a driving shaft of the vertical shaft motor and passed into the supporting shaft tube, and using a gear ratio of the reduction gear set to adjust a rotating speed of the driving shaft and then using an output shaft to output a smaller rotating speed, and the output shaft having a first steering gear installed thereon and driven and rotated by the output shaft; a shaft frame, installed at the bottom of the supporting shaft tube and sheathed on the first steering gear, and the shaft frame including a detachable end cover transversally installed at a first end of the shaft frame, a first shaft hole penetrated through the end cover, and a second shaft hole formed at the other end of the shaft frame; a pedal shaft, rotatably installed and passed into the shaft frame and out from the first shaft hole and the second shaft hole, and at least one first bearing unit being installed between the pedal shaft and the first shaft hole of the end cover; a shaft sleeve, being a long straight hollow tube, sheathed on the pedal shaft and rotatably installed and passed into the first shaft hole and the second shaft hole, and also passed into the first bearing unit, and the shaft sleeve having a second steering gear installed therein, and driven by the first steering gear and capable of converting an output power of the output shaft into an output of a rotating force in a horizontal direction; a variable-speed gear disk module, including a plurality of gear disks sheathed on the shaft sleeve, and one of the gear disks having an inner bearing connecting frame installed thereon, and the inner bearing connecting frame having an inner bearing through hole sheathed on an end of the shaft sleeve, and an outer bearing connecting frame fixed to an outer side of the inner bearing connecting frame, and the outer bearing connecting frame having an outer bearing through hole sheathed on the pedal shaft; a first one-way bearing, installed in the inner bearing through hole and coupled to the shaft sleeve; and a second one-way bearing, installed in the outer bearing through hole and coupled to the pedal shaft.

Preferably, the vertical shaft motor is an electric driving motor in a long cylindrical shape.

Preferably, the gear speed governor is a speed retardation device.

Preferably, the first steering gear and the second steering gear are fan gears installed perpendicular to each other, and engaged with each other.

Preferably, the first steering gear and the second steering gear are fan gears installed perpendicular to each other, and engaged with each other.

Preferably, at least one second bearing unit is installed between the shaft sleeve and the second shaft hole.

Preferably, the pedal shaft is passed out from a first end of the first shaft hole and latched and fixed to a first pedal component to constitute a joint rotation relation with the first pedal component, and the pedal shaft is passed out from a second end of the second shaft hole and latched and fixed to a second pedal component to constitute a joint rotation relation with the second pedal component.

Preferably, the first one-way bearing includes an inner ring and an outer ring, and the inner ring of the first one-way bearing is latched with the outer ring of the first one-way bearing in a single rotating direction, and pivotally rotated corresponding to the outer ring of the first one-way bearing in an opposite direction, and the outer ring of the first one-way bearing is fixed in the inner bearing through hole, and the inner ring of the first one-way bearing is fixed on the shaft sleeve.

Preferably, the second one-way bearing includes an inner ring and an outer ring, and the inner ring of the second one-way bearing is latched to the outer ring of the second one-way bearing in a single rotating direction, and pivotally rotated corresponding to the outer ring of the second one-way bearing in an opposite direction, and the outer ring of the second one-way bearing is fixed into the outer bearing through hole, and the inner ring of the second one-way bearing is sheathed on and fixed to the pedal shaft.

Preferably, the shaft frame includes a penetrating hole formed on an upper wall of the shaft frame and interconnected to the interior of the supporting shaft tube to allow the first steering gear to pass therein.

Preferably, the penetrating hole further includes a connecting portion extended from the penetrating hole, and the connecting portion includes an internal thread formed thereon and provided for screwing and fixing the supporting shaft tube.

Preferably, the shaft sleeve further includes a needle roller bearing installed on a wall of the inner ring at both ends separately.

Wherein, the inner bearing connecting frame and the outer bearing connecting frame include corresponding threads respectively.

In addition, the present invention further provides a clutch driver, comprising: an inner bearing connecting frame, having an inner bearing through hole sheathed on a first shaft element; an outer bearing connecting frame, installed on a side of the inner bearing connecting frame, and having an outer bearing through hole sheathed on a second shaft element; a first one-way bearing, including an inner ring and an outer ring, and the inner ring of the first one-way bearing being latched to the outer ring of the first one-way bearing in a single rotating direction, and pivotally rotated corresponding to the outer ring of the first one-way bearing in an opposite direction, and the outer ring of the first one-way bearing being fixed into the inner bearing through hole, and the inner ring of the first one-way bearing being sheathed and fixed onto the first shaft element; and a second one-way bearing, including an inner ring and an outer ring, and the inner ring of the second one-way bearing being latched to the outer ring of the second one-way bearing in a single rotating direction, and pivotally rotated corresponding to the outer ring of the second one-way bearing in an opposite direction, and the outer ring of the second one-way bearing being fixed into the outer bearing through hole, and the inner ring of the second one-way bearing being sheathed and fixed onto the second shaft element.

Preferably, the inner bearing connecting frame and the outer bearing connecting frame having corresponding threads formed thereon respectively and provided for screwing and fixing the inner bearing connecting frame and the outer bearing connecting frame.

In addition, the present invention further provides an electromechnical actuator, comprising: a gear speed governor, including at least one reduction gear set installed therein and on the driving shaft of the vertical shaft motor, and the gear speed governor is capable of adjusting a rotating speed of the driving shaft, and then using an output shaft to output a smaller rotating speed, and the output shaft having a first steering gear installed thereon and a rotation of the first steering gear is driven by the output shaft; a shaft frame, sheathed on the first steering gear, and having a detachable end cover transversally installed at a first end of the shaft frame, a first shaft hole penetrated through the end cover, and a second shaft hole formed at the other end of the shaft frame; a pedal shaft, rotatably installed and passed into the shaft frame and out from the first shaft hole and the second shaft hole; a shaft sleeve, sheathed on the pedal shaft, and the shaft sleeve rotatably passed into the first shaft hole and the second shaft hole, and the shaft sleeve having a second steering gear installed thereon and driven by the first steering gear, and the second steering gear is capable of converting an output power of the output shaft into an output of a rotating force in a horizontal direction.

Preferably, at least one first bearing unit is installed between the pedal shaft and the first shaft hole of the end cover and provided for passing the shaft sleeve therein; and at least one second bearing unit installed between the shaft sleeve and the second shaft hole.

Preferably, the vertical shaft motor is an electric driving motor in a long cylindrical shape.

Preferably, the first steering gear and the second steering gear are fan gears installed perpendicular to each other, and engaged with each other.

Wherein, the shaft sleeve further comprises a needle roller being installed on a wall of the inner ring at both ends separately.

The design of the driving apparatus of the present invention makes use of the one-way bearing installed between the gear disk and the electric driving component and between the gear disk and the pedal driving module to allow users to selectively use the electric driving component to drive the gear disk and drive the bicycle body to move forward, without linking and driving the pedal module, so as to prevent accidents caused by the pedal module which is rotated with the gear disk at a high speed.

The technical characteristics of the present invention will become apparent with the detailed description of the preferred embodiments accompanied with the illustration of related drawings as follows.

DESCRIPTION OF THE PREFERRED EMBODIMENTS

Figure 1:
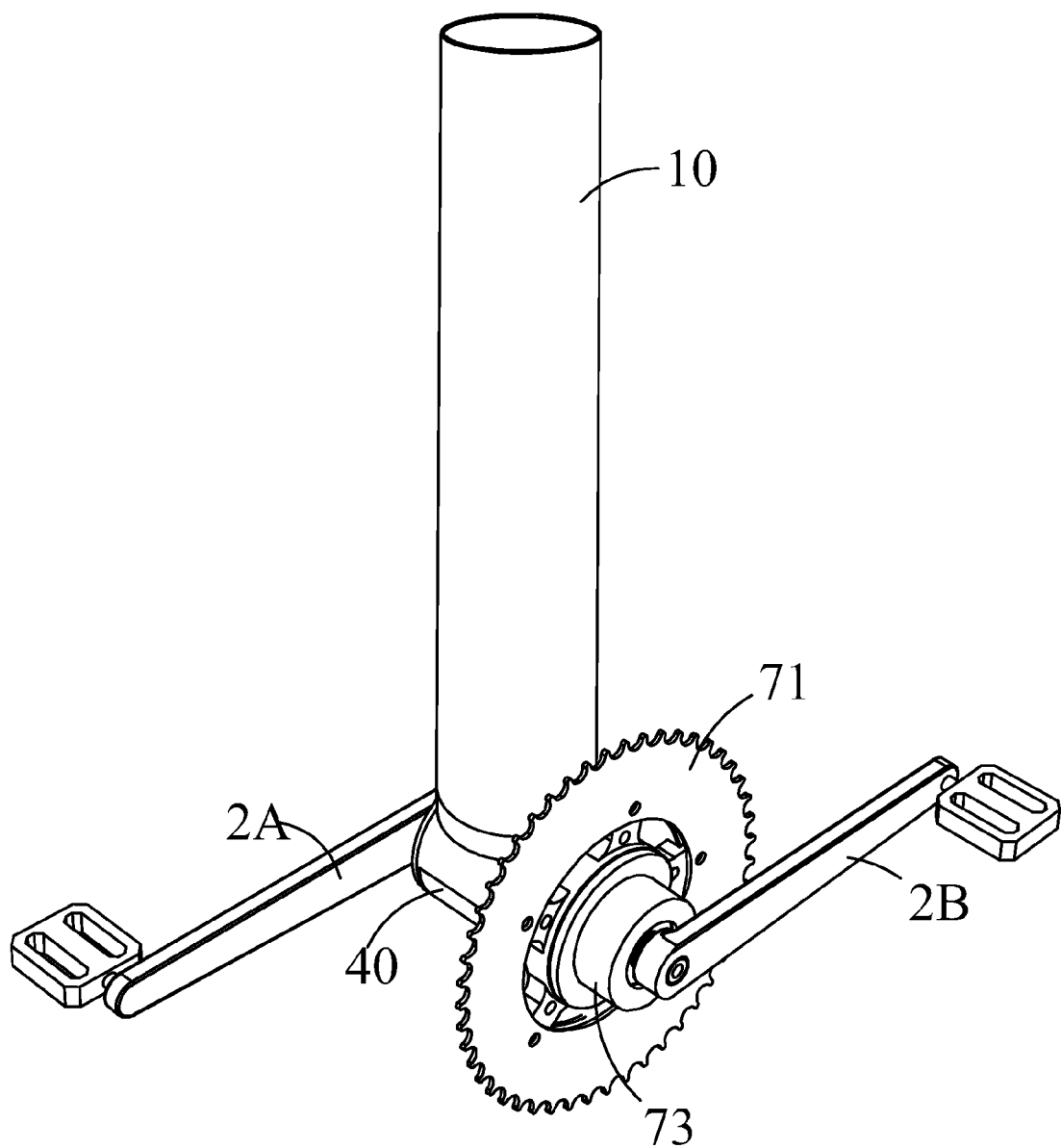
FIG. 1 is a perspective view of a driving apparatus of the present invention.
Figure 2:
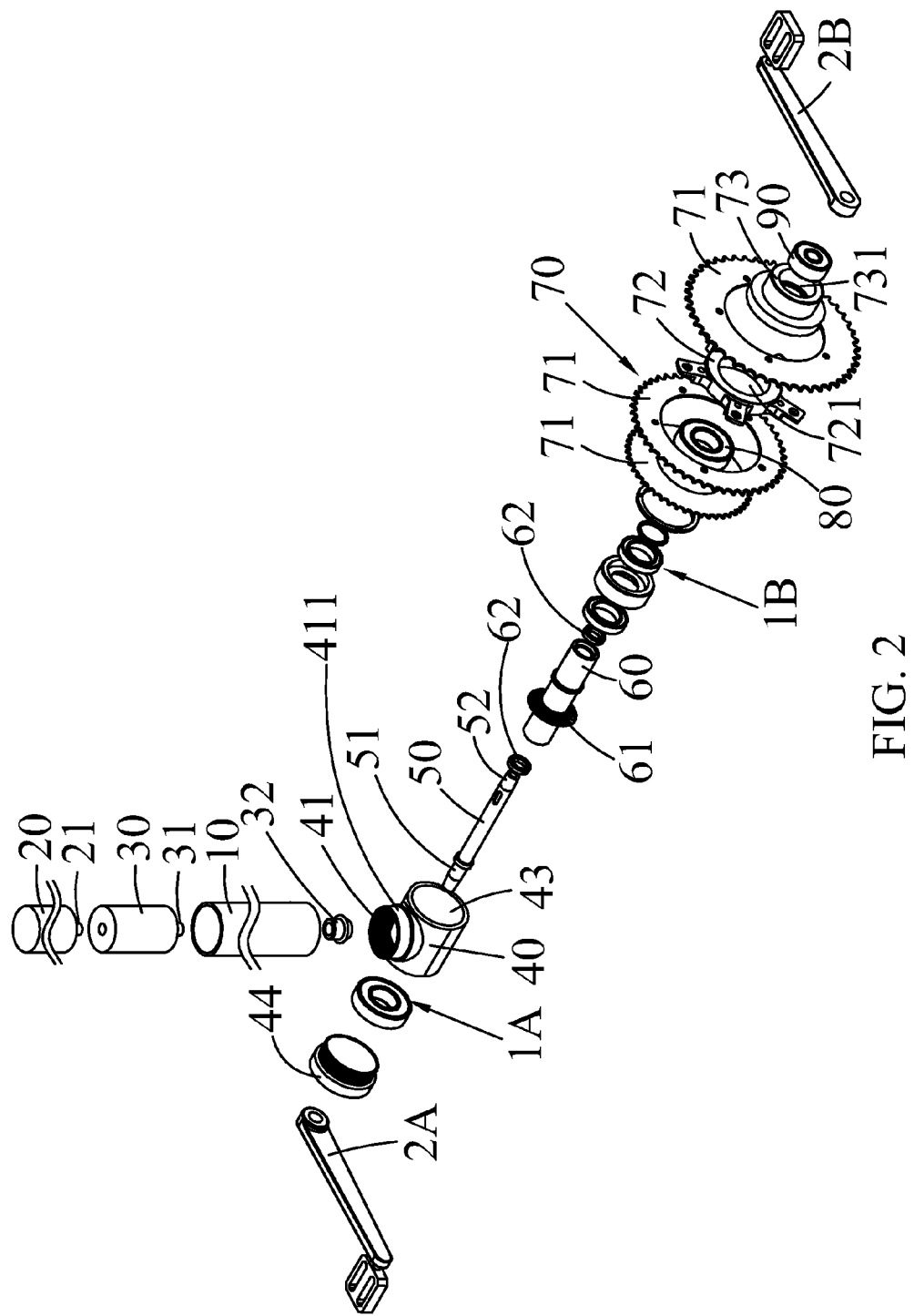
FIG. 2 is an exploded view of a driving apparatus of the present invention.
Figure 3:
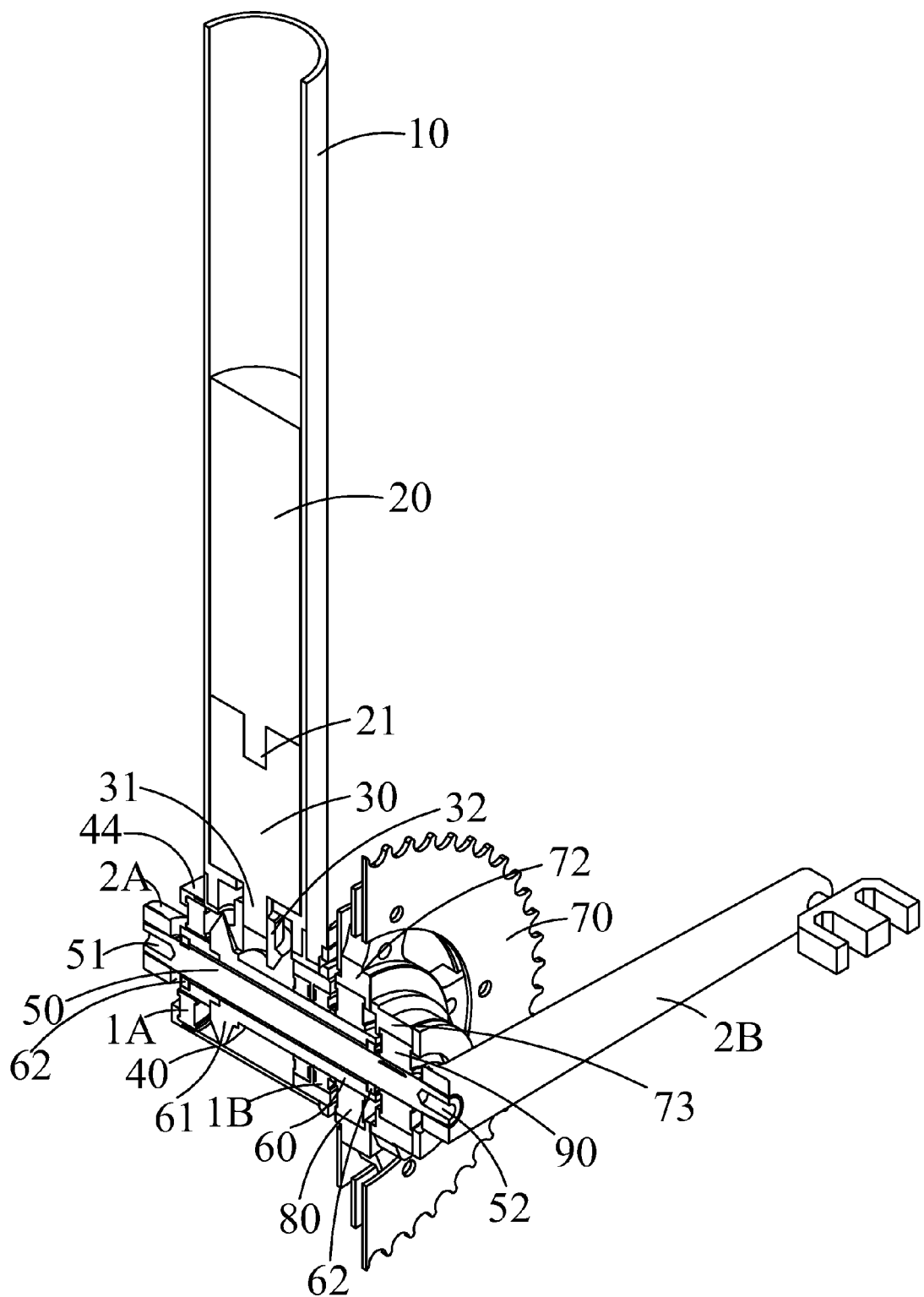
FIG. 3 is a cross-sectional view of a driving apparatus of the present invention.
Figure 4:
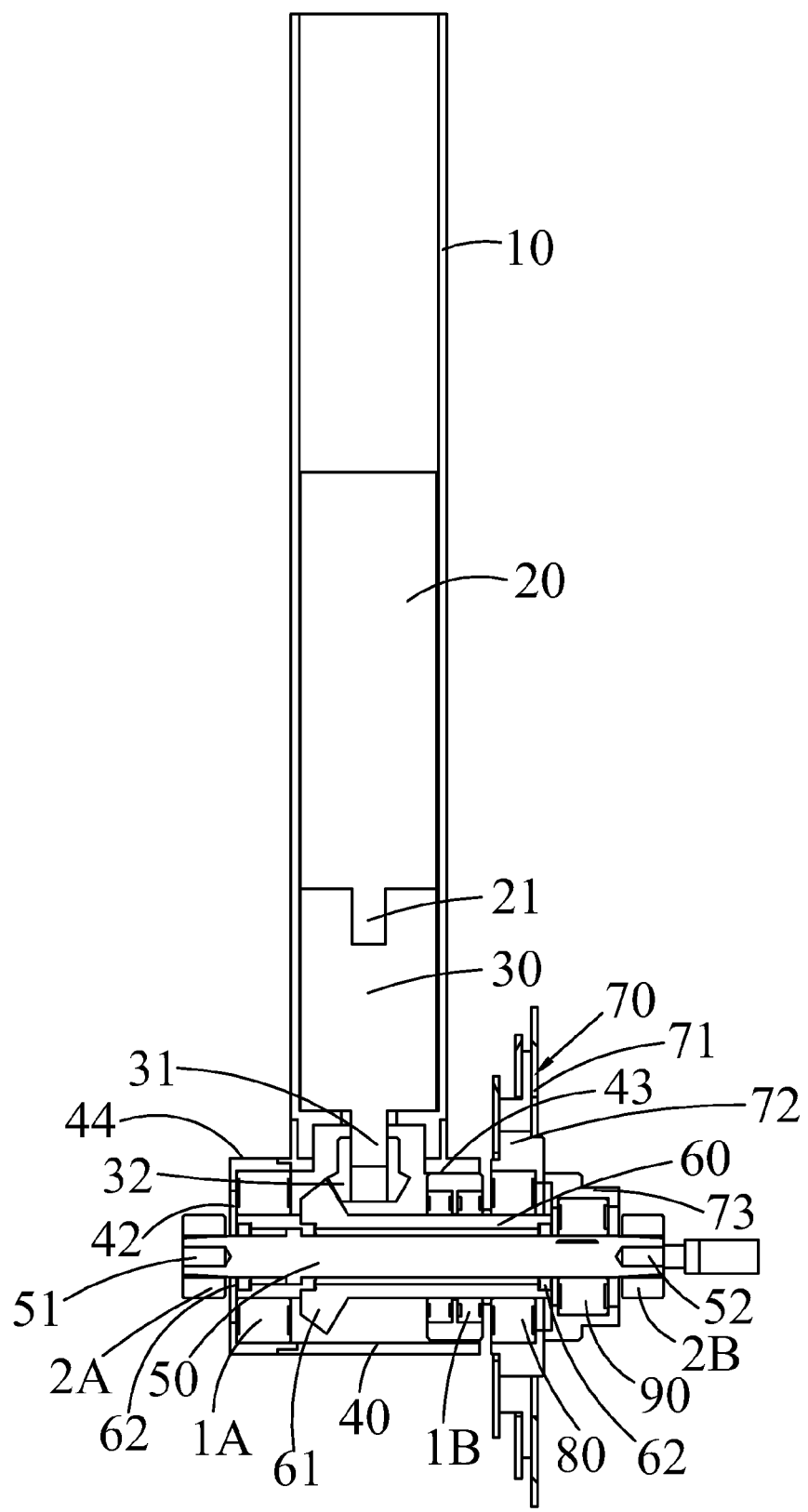
FIG. 4 is a cross-sectional side view of a driving apparatus of the present invention.

With reference to FIGS. 1 to 4 for a driving apparatus in accordance with a preferred embodiment of the present invention, the driving apparatus comprises a supporting shaft tube (10), a vertical shaft motor (20), a gear speed governor (30), a shaft frame (40), a pedal shaft (50), a shaft sleeve (60), a variable-speed gear disk module (70), a first one-way bearing (80) and a second one-way bearing (90).

The supporting shaft tube (10) is a long straight hollow tube coupled to the bottom of a seat cushion of a bicycle.

The vertical shaft motor (20) is an electric driving motor in a long cylindrical shape, and the vertical shaft motor (20) is passed and fixed into the supporting shaft tube (10), and the vertical shaft motor (20) includes a driving shaft (21), and the driving shaft (21) is extended downwardly.

The gear speed governor (30), which is installed on the driving shaft (21) of the vertical shaft motor (20) and passed into the supporting shaft tube (10), includes a speed retardation device having at least one reduction gear set installed therein. By setting the gear ratio of the reduction gear set, the gear speed governor (30) can adjust the rotating speed of the driving shaft (21) and use an output shaft (31) to output a smaller rotating speed. The adjustment of gears of this sort is a prior art that can be applied or substituted by other equivalent prior art by those ordinarily skilled in the art, and the details of the gear ratio are not intended to be covered by the claims of this invention. Thus, the gear ratio of the gears installed inside the gear speed governor (30) will not be described in details here. The output shaft (31) includes a first steering gear (32) installed thereon and coupled and latched to the output shaft (31) and driven and rotated by the output shaft (31), wherein the first steering gear (32) can be a fan gear.

The shaft frame (40), which includes a penetrating hole (41) formed on an upper wall of the shaft frame (40), is installed at the bottom of the supporting shaft tube (10) and sheathed on the first steering gear (32). A connecting portion (411) extended from the penetrating hole (41), and an internal thread which provided for screwing and fixing the supporting shaft tube (10) formed on the connecting portion (411) The penetrating hole (41) is interconnected to the interior of the supporting shaft tube (10) to allow the first steering gear (32) to pass in, and the shaft frame (40) includes a detachable end cover (44) transversally installed at a first end. The end cover (44) includes a first shaft hole (42) penetrated through the end cover (44), and a second shaft hole (43) formed at the other end of the shaft frame (40).

The pedal shaft (50) can be rotatably installed and passed into the shaft frame (40) and passed out from the first shaft hole (42) and the second shaft hole (43), and at least a first bearing unit (1A) is installed between the pedal shaft (50) and the first shaft hole (42) of the end cover (44). Therefore, the pedal shaft (50) can be smoothly rotated with the first shaft hole (42). The pedal shaft (50), which is latched and fixed to a first pedal component (2A), is passed out from a first end (51) of the first shaft hole (42), and the first end (51) and the first pedal component (2A) constitute a joint rotation relation. The pedal shaft (50), which is latched and fixed to a second pedal component (2B), is passed out from a second end (52) of the second shaft hole (43), the second end (52) and the second pedal component (2B) constitute a joint rotation relation.

The shaft sleeve (60) is a long tube component rotatably sheathed on the pedal shaft (50) and can rotatably passed into the first shaft hole (42) and the second shaft hole (43). The shaft sleeve (60) is passed into the first bearing unit (1A), and at least one second bearing unit (1B) is installed between the shaft sleeve (60) and the second shaft hole (43). The shaft sleeve (60) includes a second steering gear (61) installed thereon, wherein the second steering gear (61) is a fan gear corresponding to the first steering gear (32). The second steering gear (61) is installed perpendicular to the first steering gear (32) and the second steering gear (61) engaged with the first steering gear (32), so as to convert an output power of the output shaft (31) into an output of a rotating force in a horizontal direction. In addition, the shaft sleeve (60) further includes a needle roller bearing (62) installed on a wall of the inner ring at both ends respectively and sheathed on the wall of the pedal shaft (50).

The variable-speed gear disk module (70) includes a plurality of adjacent gear disks (71), and the gear disks (71) are sheathed on the shaft sleeve (60). One of the gear disks (71) includes an inner bearing connecting frame (72) installed thereon, and the inner bearing connecting frame (72) has an inner bearing through hole (721) sheathed on an end of the shaft sleeve (60). An outer bearing connecting frame (73) is fixed to an outer side of the inner bearing connecting frame (72), and the outer bearing connecting frame (73) includes an outer bearing through hole (731) sheathed on the pedal shaft (50). The inner bearing connecting frame (72) and the outer bearing connecting frame (73) have corresponding threads formed thereon and provided for screwing and fixing the inner bearing connecting frame (72) and the outer bearing connecting frame (73).

The first one-way bearing (80) includes an inner ring and an outer ring The inner ring of the first one-way bearing (80) is latched to the outer ring of the first one-way bearing (80) in a single rotating direction, and the inner ring of the first one-way bearing (80) is pivotally rotated corresponding to the outer ring in an opposite direction. The outer ring of the first one-way bearing (80) is fixed into the inner bearing through hole (721), and the inner ring of the first one-way bearing (80) is sheathed and fixed on the shaft sleeve (60). Therefore, when the output shaft (31) rotates, the variable-speed gear disk module (70) is linked to rotate, and the rotation of the variable-speed gear disk module (70) will not affect the output shaft (31) by feedbacks.

The second one-way bearing (90) includes an inner ring and an outer ring. The inner ring of the second one-way bearing (90) is latched to the outer ring of the second one-way bearing (90) in a single rotating direction, and the inner ring of the second one-way bearing (90) is pivotally rotated corresponding to the outer ring in an opposite direction. The outer ring of the second one-way bearing (90) is fixed into the outer bearing through hole (731), and the inner ring of the second one-way bearing (90) is sheathed and fixed onto the pedal shaft (50). Therefore, when the pedal shaft (50) rotates, the variable-speed gear disk module (70) is linked and driven to rotate, and the rotation of the variable-speed gear disk module (70) will not affect the pedal shaft (31) by feedbacks.

Through the skillful design of the driving apparatus of the present invention, a one-way bearing is installed between the gear disk (71) and the electric driving component or between the gear disk (71) and the pedal driving module to allow users to selectively use an electric driving component to drive the gear disk (71) to move the bicycle body forward without linking or driving the pedal module (2A)(2B), so as to prevent accidents or imcomfort caused by the pedal module (2A)(2B) that is rotated with the gear disk (71) at a high speed. In addition, when users selectively use the pedals for the output, the electric driving component such as the output shaft (31) will not be driven by the feedbacks, and the burden of the users to apply force for the riding can be reduced. Furthermore, using the pedals for the output can prevent internal components from being rubbed or worn out unnecessarily. The invention can improve the practical application and safety of the application significantly.

The present invention further provides an electromechnical actuator comprising a vertical shaft motor (20), a gear speed governor (30), a shaft frame (40), a pedal shaft (50) and a shaft sleeve (60).

Wherein, the vertical shaft motor (20) includes a driving shaft (21). The gear speed governor (30) is installed on the driving shaft (21) of the vertical shaft motor (20) and capable of adjusting the rotating speed of the driving shaft (21) to output a smaller rotating speed by using an output shaft (31), and the output shaft (31) includes a first steering gear (32) installed thereon. Wherein the shaft frame (40) is sheathed on the first steering gear (32), and the shaft frame (40) includes a detachable end cover (44) transversally installed at a first end of the shaft frame (40), and the end cover (44) includes a first shaft hole (42) penetrated through the end cover (44), and a second shaft hole (43) is formed at the other end of the shaft frame (40). The pedal shaft (50) is rotatably rotated and passed into the shaft frame (40) and passed out from the first shaft hole (42) and the second shaft hole (43).

The shaft sleeve (60) is sheathed on the pedal shaft (50), and the shaft sleeve (60) is rotatably passed in the first shaft hole (42) and the second shaft hole (43). The shaft sleeve (60) includes a second steering gear (61) installed thereon and driven by the first steering gear (32), and the second steering (61) is capable of converting an output power of the output shaft (32) into an output of a rotating force in a horizontal direction.

The present invention further comprises a clutch driver comprising an inner bearing connecting frame (72), an outer bearing connecting frame (73), a first one-way bearing (80) and a second one-way bearing (90).

Wherein, the inner bearing connecting frame (72) includes an inner bearing through hole (721) sheathed on a first shaft element, and an outer side of the inner bearing connecting frame (72) installs the outer bearing connecting frame (73). The outer bearing connecting frame (73) includes an outer bearing through hole (731) sheathed on a second shaft element, wherein the inner bearing connecting frame (72) and the outer bearing connecting frame (73) have corresponding threads formed thereon respectively for screwing and fixing the inner bearing connecting frame (72) and the outer bearing connecting frame (73).

Wherein, the first one-way bearing (80) has an inner ring and an outer ring, and the inner ring of the first one-way bearing (80) is latched to the outer ring of the first one-way bearing (80) in a single rotating direction, and the inner ring of the first one-way bearing (80) is pivotally rotated corresponding to the outer ring in an opposite direction. The outer ring of the first one-way bearing (80) is fixed into the inner bearing through hole (721), and the inner ring of the first one-way bearing (80) is sheathed and fixed onto the first shaft element. The second one-way bearing (90) includes an inner ring and an outer ring, and the inner ring of the second one-way bearing (90) is latched to the outer ring of the second one-way bearing (90) in a single rotating direction, and the inner ring of the second one-way bearing (90) is pivotally rotated corresponding to the outer ring of the second one-way bearing (90) in an opposite direction. The outer ring of the second one-way bearing (90) is fixed into the outer bearing through hole (731), and the inner ring of the second one-way bearing (90) is sheathed and fixed onto the second shaft element.

In summation of the description above, the present invention breaks through the prior, achieves the expected effects, and complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A driving apparatus, comprising:
   a vertical shaft motor, including a driving shaft;
   a gear speed governor, including at least one reduction gear set installed therein and on the driving shaft of the vertical shaft motor, and the gear speed governor is capable of adjusting a rotating speed of the driving shaft to output a smaller rotating speed by an output shaft, and a first steering gear installed on the output shaft, and a rotation of the first steering gear is driven by the output shaft;
   a shaft frame, installed at the bottom of a supporting shaft tube and sheathed on the first steering gear, and having a detachable end cover transversally installed at a first end of on the shaft frame, a first shaft hole penetrated through the end cover, and a second shaft hole formed at another end of the shaft frame;
   a pedal shaft, rotatably installed and passed into the shaft frame and out from the first shaft hole and the second shaft hole, and at least one first bearing unit being installed between the pedal shaft and the first shaft hole of the end cover;
   a shaft sleeve, sheathed on the pedal shaft, and the shaft sleeve rotatably installed and passed into the first shaft hole and the second shaft hole, and also passed into the first bearing unit, and the shaft sleeve having a second steering gear driven by the first steering gear, and the second steering gear is capable of converting an output power of the output shaft into an output of a rotating force in a horizontal direction;
   a variable-speed gear disk module, including a plurality of gear disks sheathed on the shaft sleeve, and one of the gear disks having an inner bearing connecting frame installed thereon, and the inner bearing connecting frame having an inner bearing through hole sheathed on an end of the shaft sleeve, and an outer bearing connecting frame fixed to an outer side of the inner bearing connecting frame, and the outer bearing connecting frame having an outer bearing through hole sheathed on the pedal shaft;
   a first one-way bearing, installed in the inner bearing through hole and coupled to the shaft sleeve; and
   a second one-way bearing, installed in the outer bearing through hole and coupled to the pedal shaft.

2. The driving apparatus of claim 1, wherein the vertical shaft motor is an electric driving motor in a long cylindrical shape.

3. The driving apparatus of claim 1, wherein the gear speed governor is a speed retardation device.

4. The driving apparatus of claim 1, wherein the first steering gear and the second steering gear are fan gears installed perpendicular to each other, and engaged with each other.

5. The driving apparatus of claim 1, further comprising at least one second bearing unit installed between the shaft sleeve and the second shaft hole.

6. The driving apparatus of claim 1, wherein the pedal shaft is passed out from a first end of the first shaft hole and latched and fixed to a first pedal component to constitute a joint rotation relation with the first pedal component, and the pedal shaft is passed out from a second end of the second shaft hole and latched and fixed to a second pedal component to constitute a joint rotation relation with the second pedal component.

7. The driving apparatus of claim 1, wherein the first one-way bearing includes an inner ring and an outer ring, and the inner ring of the first one-way bearing is latched with the outer ring of the first one-way bearing in a single rotating direction, and pivotally rotated corresponding to the outer ring of the first one-way bearing in an opposite direction, and the outer ring of the first one-way bearing is fixed in the inner bearing through hole, and the inner ring of the first one-way bearing is fixed on the shaft sleeve.

8. The driving apparatus of claim 7, wherein the second one-way bearing includes an inner ring and an outer ring, and the inner ring of the second one-way bearing is latched to the outer ring of the second one-way bearing in a single rotating direction, and pivotally rotated corresponding to the outer ring of the second one-way bearing in an opposite direction, and the outer ring of the second one-way bearing is fixed into the outer bearing through hole, and the inner ring of the second one-way bearing is sheathed on and fixed to the pedal shaft.

9. The driving apparatus of claim 1, wherein the shaft frame includes a penetrating hole formed on an upper wall of the shaft frame and interconnected to an interior of the supporting shaft tube to allow the first steering gear to pass therein.

10. The driving apparatus of claim 9, wherein the penetrating hole further includes a connecting portion extended from the penetrating hole, and the connecting portion includes an internal thread formed thereon and provided for screwing and fixing the supporting shaft tube.

11. The driving apparatus of claim 1, wherein the shaft sleeve further includes a needle roller bearing installed on a wall of the inner ring at both ends separately.

12. The driving apparatus of claim 1, wherein the inner bearing connecting frame and the outer bearing connecting frame include corresponding threads respectively.

13. A clutch driver, comprising:
an inner bearing connecting frame, having an inner bearing through hole sheathed on a first shaft element;
an outer bearing connecting frame, installed on a side of the inner bearing connecting frame, and having an outer bearing through hole sheathed on a second shaft element;
a first one-way bearing, installed in the inner bearing through hole, and coupled to the first shaft element; and
a second one-way bearing, installed in the outer bearing through hole, and coupled to the second shaft element.

14. The clutch driver of claim 13, wherein the first one-way bearing includes an inner ring and an outer ring, and the inner ring of the first one-way bearing is latched to the outer ring of the first one-way bearing in a single rotating direction, and pivotally rotated corresponding to the outer ring of the first one-way bearing in an opposite direction, and the outer ring of the first one-way bearing is fixed into the inner bearing through hole, and the inner ring of the first one-way bearing sheathed and fixed onto the first shaft element; and the second one-way bearing has an inner ring and an outer ring, and the inner ring of the second one-way bearing is latched to the outer ring of the second one-way bearing in a single rotating direction, and pivotally rotated corresponding to the outer ring of the second one-way bearing in an opposite direction, and the outer ring of the second one-way bearing is fixed into the outer bearing through hole, and the inner ring of the second one-way bearing is sheathed and fixed onto the second shaft element.

15. The clutch driver of claim 14, wherein the inner bearing connecting frame and the outer bearing connecting frame have corresponding threads formed thereon respectively and provided for screwing and fixing the inner bearing connecting frame and the outer bearing connecting frame with each other.

16. An electromechnical actuator, comprising:
a vertical shaft motor, having a driving shaft;
a gear speed governor, including at least one reduction gear set installed therein and on the driving shaft of the vertical shaft motor, and the gear speed governor is capable of adjusting a rotating speed of the driving shaft, and then using an output shaft to output a smaller rotating speed, and the output shaft having a first steering gear installed thereon and a rotation of the first steering gear is driven by the output shaft;
a shaft frame, sheathed on the first steering gear, and having a detachable end cover transversally installed at a first end of the shaft frame, a first shaft hole penetrated through the end cover, and a second shaft hole formed at another end of the shaft frame;
a pedal shaft, rotatably installed and passed into the shaft frame and out from the first shaft hole and the second shaft hole;
a shaft sleeve, sheathed on the pedal shaft, and the shaft sleeve rotatably passed into the first shaft hole and the second shaft hole, and the shaft sleeve having a second steering gear installed thereon and driven by the first steering gear, and the second steering gear is capable of converting an output power of the output shaft into an output of a rotating force in a horizontal direction.

17. The electromechnical actuator of claim 16, further comprising at least one first bearing unit installed between the pedal shaft and the first shaft hole of the end cover and provided for passing the shaft sleeve therein; and at least one second bearing unit installed between the shaft sleeve and the second shaft hole.

18. The electromechnical actuator of claim 17, wherein the vertical shaft motor is an electric driving motor in a long cylindrical shape.

19. The electromechnical actuator of claim 18, wherein the first steering gear and the second steering gear are fan gears installed perpendicular to each other, and engaged with each other.

20. The electromechnical actuator of claim 19, wherein the shaft sleeve further comprises a needle roller being installed on a wall of the inner ring at both ends separately.

\* \* \* \* \*